United States Patent
Lord et al.

(10) Patent No.: US 10,625,611 B2
(45) Date of Patent: Apr. 21, 2020

(54) ELECTRIC VEHICLE CHARGING INTERFACE DEVICE

(71) Applicant: Clearpath Robotics Inc., Kitchener (CA)

(72) Inventors: Matthew Lord, Kitchener (CA); Michael Irvine, Mississauga (CA); Philip Dimitri Perivolaris, Kitchener (CA); Anthony Robert Shaw, Waterloo (CA); Arsalan Khan, Burlington (CA); Catalin Radu Gradinaru, Waterloo (CA)

(73) Assignee: CLEARPATH ROBOTICS INC., Kitchener (CA)

( * ) Notice: Subject to any disclaimer, the term of this patent is extended or adjusted under 35 U.S.C. 154(b) by 385 days.

(21) Appl. No.: 15/449,441

(22) Filed: Mar. 3, 2017

(65) Prior Publication Data

US 2017/0253136 A1 Sep. 7, 2017

Related U.S. Application Data

(60) Provisional application No. 62/303,104, filed on Mar. 3, 2016.

(51) Int. Cl.
| | |
|---|---|
| *B60L 11/18* | (2006.01) |
| *H01R 13/631* | (2006.01) |
| *B60L 53/16* | (2019.01) |
| *B60L 53/10* | (2019.01) |
| *H01R 13/24* | (2006.01) |

(52) U.S. Cl.
CPC ........... *B60L 11/1818* (2013.01); *B60L 53/11* (2019.02); *B60L 53/16* (2019.02); *H01R 13/6315* (2013.01); *H01R 13/24* (2013.01); *H01R 2201/26* (2013.01); *Y02T 10/7005* (2013.01); *Y02T 10/7072* (2013.01); *Y02T 90/121* (2013.01); *Y02T 90/128* (2013.01); *Y02T 90/14* (2013.01)

(58) Field of Classification Search
CPC ...... B60L 11/1818; B60L 53/11; B60L 53/16; H01R 13/6315; H01R 13/24; Y02T 10/7005; Y02T 10/7072
See application file for complete search history.

(56) References Cited

U.S. PATENT DOCUMENTS

| | | | | |
|---|---|---|---|---|
| 5,795,172 | A * | 8/1998 | Shahriari | G01R 31/2808 439/260 |
| 10,017,062 | B2 * | 7/2018 | Kufner | H01R 13/6315 |
| 2017/0253136 | A1 * | 9/2017 | Lord | H01R 13/6315 |

* cited by examiner

*Primary Examiner* — Abdullah A Riyami
*Assistant Examiner* — Nader J Alhawamdeh
(74) *Attorney, Agent, or Firm* — Bereskin & Parr LLP/S.E.N.C.R.L., s.r.l.

(57) ABSTRACT

An electric vehicle charging interface device is provided. The device includes a chassis having a top, a bottom, a front side, and a back side opposite the front side, the chassis configured to move between an uncompressed position and a compressed position relative to a longitudinal axis. The device further includes two electrodes extending from the front side of the chassis, and, a biasing portion configured to bias the chassis towards the uncompressed position.

20 Claims, 9 Drawing Sheets

ELECTRIC VEHICLE CHARGING INTERFACE DEVICE

CROSS-REFERENCE TO RELATED APPLICATIONS

This application claims the benefit of the filing date of U.S. Provisional Patent Application No. 62/302,104 filed on 3 Mar. 2016, which is herein incorporated by reference in its entirety for all purposes.

FIELD

The specification relates generally to electric vehicles, and specifically to an electric vehicle charging interface device.

BACKGROUND

Electric vehicles are quickly becoming ubiquitous, and hence charging of such vehicles is becoming a significant challenge. Various systems for interfacing charging systems which such vehicles are currently available, but none are ideal. For example, electric cars can presently be connected to a charging system using a manual plug; however such a system requires manual intervention. Electric autonomous vehicles can interface with electrodes that are located on a warehouse or factory floor, however such charging is generally low power for safety and power transmission reasons. Systems which transmit higher power further require that the vehicle be equipped with an active charging interface system, for example stepper motors and the like, for lowering mating electrodes to the electrodes located on the floor.

BRIEF DESCRIPTIONS OF THE DRAWINGS

For a better understanding of the various implementations described herein and to show more clearly how they may be carried into effect, reference will now be made, by way of example only, to the accompanying drawings in which.

SUMMARY

The present specification provides an electric vehicle charging interface device that includes two electrodes extending from a front end of a chassis, the chassis configured to move between an uncompressed position and a compressed position, the chassis being biased towards the uncompressed position using a biasing portion. When the device is fastened to a floor, the electrodes generally extend outwards from the front side, horizontal to the floor. The two electrodes are in turn connected to an external power supply. An electric vehicle with complementary electrodes, located at a position on the vehicle that is complementary to the electrodes of the device, can interface with the electrodes as the vehicle mates with the device, the vehicle moving the chassis towards the compressed position by the complementary electrodes placing pressure on the electrodes of the device. As the chassis is biased towards the uncompressed position, the electrodes of the chassis are in turn biased towards the complementary electrodes of the vehicle, thereby holding the two sets of electrodes in electrical communication with each other, such that the vehicle can be charged using power from the external power supply, and specifically using a higher power than would be possible with conventional floor-based electrodes. Once a battery of the vehicle is charged, the vehicle can back away from the device, and the chassis moves back to the uncompressed position. In some implementations, the device can include an interlock configured to detect when the vehicle has mated with the electrodes; the interlock can be further configured to provide power from the external power supply to the two electrodes only when the vehicle has mated with the two electrodes.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

Furthermore, as will become apparent, in this specification certain elements may be described as connected physically, electronically, or any combination thereof, according to context. In general, components that are electrically connected are configured to communicate (that is, they are capable of communicating) by way of electric signals. According to context, two components that are physically coupled and/or physically connected may behave as a single element. In some cases, physically connected elements may be integrally formed, e.g., part of a single-piece article that may share structures and materials. In other cases, physically connected elements may comprise discrete components that may be fastened together in any fashion. Physical connections may also include a combination of discrete components fastened together, and components fashioned as a single piece.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

An aspect of the specification provides a device comprising: a chassis having a top, a bottom, a front side, and a back side opposite the front side, the chassis configured to move between an uncompressed position and a compressed position relative to a longitudinal axis; two electrodes extending from the front side of the chassis; and, a biasing portion configured to bias the chassis towards the uncompressed position.

The chassis can further comprise: a U-shaped portion configured to pivot with respect to the longitudinal axis, each of the two electrodes extending from a respective end of the U-shaped portion.

The device can further comprise a guide portion having a front end and a back end, the chassis configured to slide along the guide portion between the front end and the back end, the chassis located proximal the front end of the guide portion in the uncompressed position and located away from the front end in the compressed position. The chassis can further comprise: a U-shaped portion and a sliding portion, the sliding portion configured to mate with the guide portion and slide along the guide portion, the U-shaped portion on top of the sliding portion and pivotally connected thereto, each of the two electrodes extending from a respective end of the U-shaped portion. The guide portion can be configured for attachment to a floor, the bottom of the chassis is configured can be configured to slide along the guide portion, and the two electrodes can be configured to extend horizontally from the chassis, relative to the floor, when the guide portion is attached to the floor. The biasing portion can extend from the back side of the chassis towards the back end of the guide portion. The biasing portion can extend from the back side of the chassis towards the back end of the guide portion, and can be further attached to each of the back side of the chassis and the back end of the guide portion.

The two electrodes can be symmetrically arranged about the longitudinal axis of the chassis.

Each the two electrodes can be configured to pivot relative to the chassis.

Each of the two electrodes can form an angle of about 15° with the front side of the chassis, each of the two electrodes angled towards each other.

Each of the two electrodes can form an angle in a range of about 0° to about 70° with the front side of the chassis, each of the two electrodes angled towards each other.

Each of the two electrodes can further comprise: a respective body; and a respective electrical connection portion extending from the respective body, the respective electrical connection portion configured to: mate with a corresponding electrode of a vehicle: and scrape against the corresponding electrode of the vehicle during a mating operation with the vehicle. During the mating operation, the chassis can moves towards the compressed position, the biasing portion being compressed during the mating operation, the two electrodes being biased towards corresponding electrodes of the vehicle.

The device can further comprise electrical connectors configured to connect the two electrodes to an external power supply.

The device can further comprise an interlock configured to detect when a vehicle has mated with the two electrodes. The interlock can extend from the front side of the chassis. The interlock can further comprise one or more of a passive interlock, a magnetic interlock and an optical interlock. The interlock can be further configured to provide power from an external power supply to the two electrodes only when the vehicle has mated with the two electrodes.

The interlock can be located between the two electrodes.

The device can further comprise a docking target.

DETAILED DESCRIPTION

Figure 1:
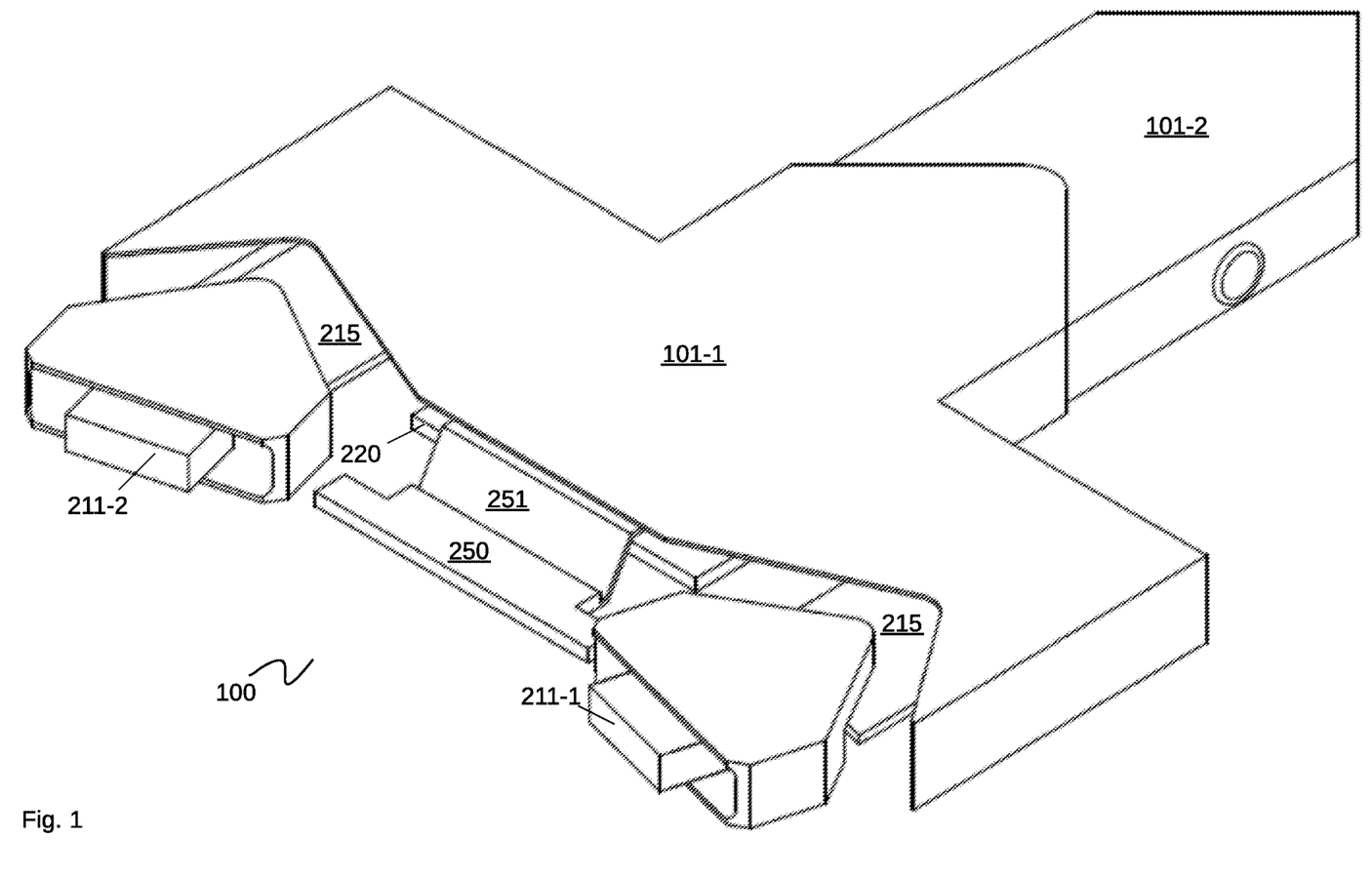
FIG. 1 depicts perspective view of an electric vehicle charging interface device, according to non-limiting implementations.
Figure 2:
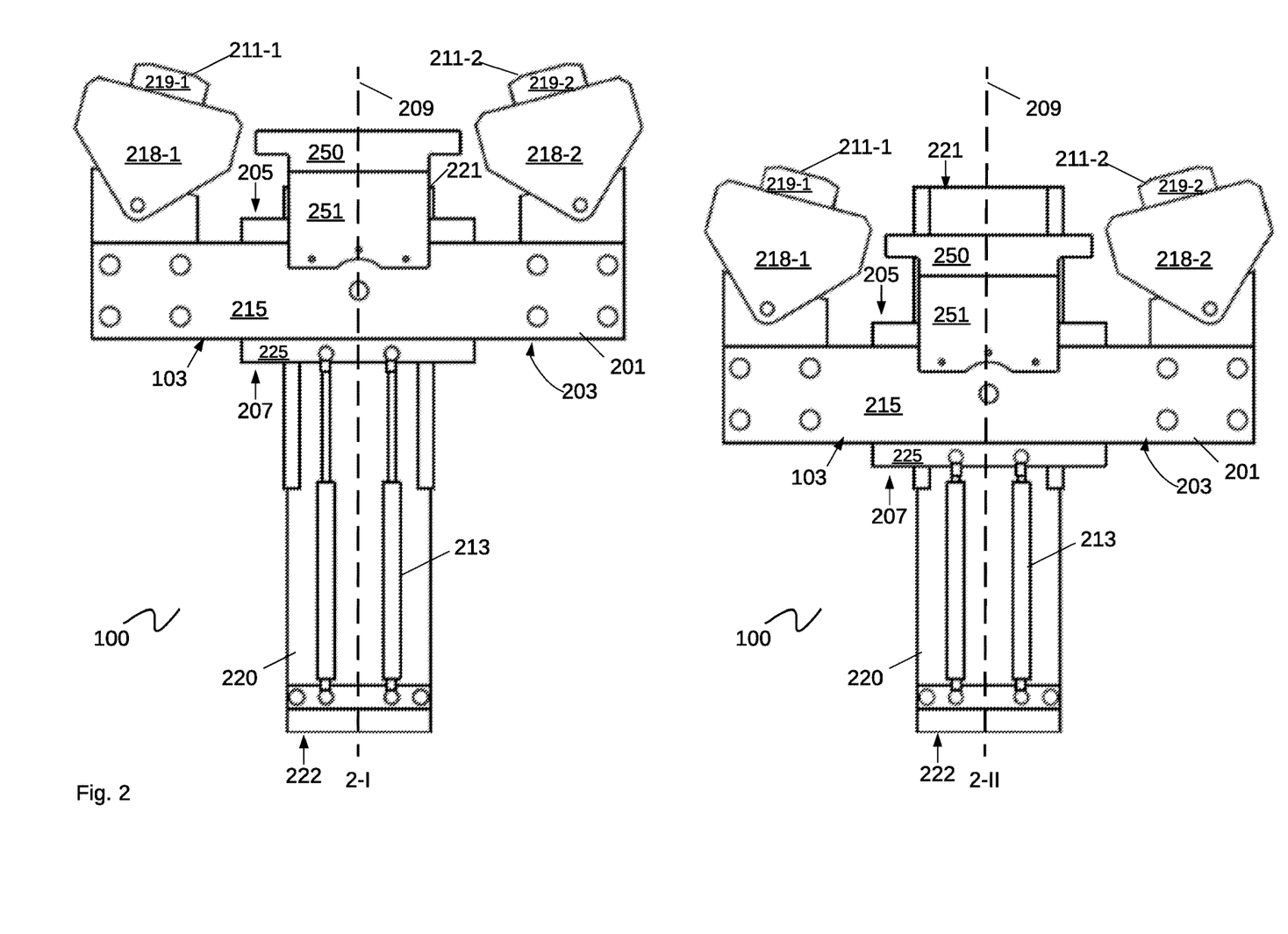
FIG. 2 depicts the device of FIG. 1, with a housing removed, in an uncompressed position and a compressed position, according to non-limiting implementations.

Attention is directed to FIG. 1 and FIG. 2 each of which depicts an electric vehicle charging interface device 100 (interchangeably referred to herein as device 100). Specifically, FIG. 1 depicts a perspective view of device 100 when a housing (comprising two portions 101-1, 101-2, and generally referred to hereafter as housing 101) is present; and FIG. 2 depicts device 100 with housing 101 removed to show an internal chassis 103, in an uncompressed position 2-I, and a compressed position 2-II, as described in further detail below. External housing 101 is optional, can be removable, and generally protects and/or hides internal and/or some moving parts of device 100.

With reference to both FIG. 1 and FIG. 2, device 100 comprises: chassis 103 having a top 201, a bottom 203 (not visible in FIG. 1 and FIG. 2 but opposite top 201; also see FIG. 8), a front side 205, and a back side 207 opposite front side 205, chassis 103 configured to move between uncompressed position 2-I and compressed position 2-II relative to a longitudinal axis 209 (e.g. that extends between front side 205 and back side 207); two electrodes 211-1, 211-2 extending from front side 205 of chassis 103; and, a biasing portion 213 configured to bias chassis 103 towards uncompressed position 2-1. For convenience, two electrodes 211-1, 211-2 will be interchangeably referred to hereafter, collectively, as two electrodes 211 and/or electrodes 211, and generically as an electrode 211. Furthermore, each of front side 205 and back side 207 can extend between top 201 and bottom 203, however as chassis 103 can have a complex shape, each of top 201, bottom 203, front side 205 and back side 207 can have multiple edges and/or surfaces, and only portions of each of top 201, bottom 203, front side 205 and back side 207 can be connected, as can be seen at least in FIG. 1 and FIG. 2.

As best seen in FIG. 2, in depicted implementations, chassis 103 can comprise: a U-shaped portion 215, with ends of the "U" extending from front side 205; in these implementations, each of two electrodes 211 extend from a respective end of the U-shaped portion 215, i.e. also from front side 205. As will be described in further detail below, in some implementations, U-shaped portion 215 can be configured to pivot with respect to longitudinal axis 209.

As depicted, each of two electrodes 211 can each comprise: a respective body 218-1, 218-2 (interchangeably referred to hereafter, collectively, as bodies 218 and, generically, as a body 218); and a respective electrical connection portion 219-1, 219-2 (interchangeably referred to hereafter, collectively, as electrical connection portions 219 and, generically, as an electrical connection portion 219) extending from the respective body 218, respective electrical connection portion 219 configured to: mate with a corresponding electrode of a vehicle: and scrape against the corresponding electrode of the vehicle during a mating operation with the vehicle, as described in further detail below. As will be also described in further detail below, in some implementations, each of two electrodes 211 can extend from a respective end of the U-shaped portion 215 and can be configured to pivot with respect to each respective end.

In particular, each electrical connection portion 219 has a respective front edge, and extends from front side 205, from a respective body 218, a given distance, that can be complementary with complementary electrodes of an electric vehicle with which electrodes 211 are configured to mate. Furthermore, while each respective front edge is depicted as having chamfered corners, in other implementations such chamfering is absent.

Furthermore, each electrical connection portion 219 is assumed to be internally connected to electrical connectors that in turn connect to an external power supply, with body 218, and other components of device 100 that are in contact with each electrical connection portion 219 and electrical connections thereto, being generally insulating.

FIG. 2 also depicts each of two electrodes 211 being angled towards each other, and/or towards longitudinal axis 209 (presuming that two electrodes 211 are located symmetrically about longitudinal axis 209). In some implementations, each of two electrodes 211 (and/or a front edge of each electrical connection portion 219) can form an angle of about 15° with front side 205 of chassis 103 (presuming that front side 205 of chassis 103 is perpendicular to longitudinal axis 209), and each of the two electrodes angled towards each other, as described above.

However, in other implementations, each of the two electrodes 211 (and/or a front edge of each electrical connection portion 219) can form an angle in a range of about 0° to about 70° with front side 205 of chassis 103 (presuming that front side 205 of chassis 103 is perpendicular to longitudinal axis 209), and each of the two electrodes 211 (and/or a front edge of each electrical connection portion 219)) angled towards each other (unless the angle is 0°, then two electrodes 211 face forward), as described above.

As also best seen in FIG. 2, in some implementations, device 100 can further comprise a guide portion 220 having a front end 221 and a back end 222, chassis 103 configured to slide along guide portion 220 between front end 221 and back end 222, chassis 103 located proximal front end 221 of guide portion 220 in uncompressed position 2-I and located away from front end 221 in compressed position 2-II.

In particular, chassis 103 can comprise: U-shaped portion 215 and a sliding portion 225, sliding portion 225 configured to mate with guide portion 220 and slide along guide portion 220, U-shaped portion 215 being located on a top of sliding portion 225, each of two electrodes 211 extending from a respective end of U-shaped portion 215, as described above. As will be described in further detail below, U-shaped portion 215 can be pivotally connected to sliding portion 225, for example at a pivot point located along longitudinal axis 209.

When present, guide portion 220 is configured for attachment to a floor (e.g. see FIG. 7), and bottom 203 of chassis 103 can be configured to slide along the guide portion 220; as such, two electrodes 211 are configured to extend horizontally from chassis 103, relative to the floor, when guide portion 220 is attached to the floor, and further two electrodes 211 are configured are to move forwards and backwards, with respect to front end 221 (and specifically two electrodes 211 are biased towards the uncompressed position 2-I but can be moved back along guide portion 220 and/or the track towards the compressed position 2-II).

In other words, in operation, guide portion 220 can comprise a track that is attached to a floor, and sliding portion 225 can be removably attached to guide portion 220 and/or the track, such that sliding portion 225 slides along guide portion 220 and/or the track; in some of these implementations, guide portion 220 and/or the track can hold thereto sliding portion 225 using guides, grooves, tabs, and the like, and/or any other mechanism that enables sliding portion 225 to mate with, and slide along guide portion 220.

As depicted, biasing portion 213 comprises one or more springs and/or pistons springs (as depicted, two piston springs), each of which can comprise a mechanical piston, a hydraulic piston, a pneumatic piston and the like. However, biasing portion 213 need not include a piston spring, but can comprise any type of spring that can bias chassis 103 to uncompressed position 2-1.

Furthermore, as depicted, biasing portion 213 extends from back side 207 of chassis 103 towards back end 222 of guide portion 220. Specifically, as depicted, biasing portion 213 extends from back side 207 of chassis 103 towards back end 222 of guide portion 220, and is further attached to each of back side 207 of chassis 103 and back end 222 of guide portion 220.

In other words, as depicted, as guide portion 220 can be in a fixed position, when mounted and/or attached to a floor, biasing portion 213 can be fixed at back end 222 of guide portion 220, and bias chassis 103 towards uncompressed position 2-I by applying pressure to chassis 103 (e.g. at back side 207), to slide chassis 103 along guide portion 220 towards front end 221.

Regardless, chassis 103 is generally biased towards uncompressed position 2-I, and compressed towards back end 222 when pressure and/or a force is applied to front side 205 and/or electrodes 211, for example by an electric vehicle, as described in further detail below. In particular, biasing portion 213 biases electrodes 211 forwards and/or outwards, in a direction extending along outward from front side 205 along longitudinal axis 209, such that in any position, other than uncompressed position 2-I, an outward and/or forward force is exerted by electrodes 211 on anything touching and/or compressing chassis 103, for example via a force exerted onto electrodes 211.

However, while particular mechanisms for biasing chassis 103 towards uncompressed position 2-I are depicted (e.g. sliding portion 225 mating with guide portion 220 and biased using biasing portion 213), other mechanisms for biasing chassis 103 towards uncompressed position 2-I are within the scope of present implementations. For example, in some implementations, device 100 can alternatively comprise mounting components for mounting chassis 103 to a wall; as such, chassis 103 can then extend from the wall, and be biased away from the wall in uncompressed position 2-I, and compressed towards the wall when pressure and/or a force is applied to front side 205 and/or electrodes 211. In such implementations, springs, pistons and the like, can be used to bias chassis 103 towards uncompressed position 2-I, and the spring, pistons and the like, can be attached to the wall, a floor, the mounting components, and the like. In yet further implementations, device 100 can further comprise mounting components for mounting chassis 103 to a floor using a bracket, and the like, that elevates chassis 103 above the floor without using a track and the like; as such, chassis 103 can then extend from the bracket, and the like, and be biased away from the bracket, and the like, in uncompressed position 2-I, and compressed towards the bracket, and the like, when pressure and/or a force is applied to front side 205 and/or electrodes 211. In such implementations, springs, pistons and the like, can be used to bias chassis 103 towards uncompressed position 2-I, and the spring, pistons and the like, can be attached to the bracket, a floor, the mounting components, and the like.

With reference to FIG. 1, it is now apparent that external housing 101, when present, can cover much of chassis 103, guide portion 220, and biasing portion 213. Indeed, as depicted, external housing 101 is in two portions 101-1, 101-2 that move relative to each other: a front portion 101-1 adjacent electrodes 211 that covers chassis 103, and a rear portion 101-2 that covers biasing portion 213 and back end 222 of guide portion 220. In general, as device 100 is compressed from uncompressed position 2-I to compressed position 2-II, front portion 101-1 slides over rear portion 101-2.

With reference to both FIG. 1 and FIG. 2, device 100 can further comprise an optional interlock 250 configured to detect when a vehicle has mated with two electrodes 211. Specifically, as depicted, two electrodes 211 are symmetrically arranged about longitudinal axis 209 of chassis 103, and interlock 250 is located between two electrodes 211, and specifically extending from front side 205 of chassis 103, for example symmetrical about longitudinal axis 209. In particular, interlock 250 can extend from a front side of U-shaped portion 215 using a bracket 251.

Furthermore, as best seen in FIG. 1, interlock 250 can be located below a plane formed by two electrodes 211 (e.g. when device 100 and/or guide portion 220 is mounted to a floor) such that when a vehicle is applying a force and/or pressure to two electrodes 211, interlock 250 can fit under the vehicle, but still move over guide portion 220 when chassis 103 is moved towards compressed position 2-II. Hence, in these implementations, bracket 251 is Z-shaped and attached to U-shaped portion 215, and bends towards bottom 203 and then extends from front side 205 parallel to top 201, with interlock 25 attached to an end of bracket 251 opposite an end attached to U-shaped portion 215.

In general, interlock 250 is further configured to turn power on from an external power supply to two electrodes 211 only when the vehicle has mated with two electrodes 211, and turns the power off when the vehicle is no longer mated with two electrodes 211. Hence, interlock 250 prevents power from being applied to two electrodes 211 unless a vehicle is mated therewith, providing a safety feature to device 100. Furthermore, interlock 250 can comprise a passive interlock, including, but not limited to, a magnetic interlock, an optical interlock and the like; as such, there is no need to equip a vehicle with a device for indicating to interlock 250 that the vehicle has mated with two electrodes 211.

Hence, in general, device 100 can be used for high power charging of an electric vehicle. For example, electrodes 211 extend from a front of device 100 and not from a floor (e.g. of a warehouse and/or a factory) and hence is inherently safer. Secondly, pressure is applied between electrodes 211 and complementary electrodes an electric vehicle (described further below) using biasing portion 213 to facilitate contact there between, which can be important in higher power charging. At least these two features cooperate to provide such high power charging functionality. Thirdly, interlock 250 can be used to turn power on and/off such that power is supplied to the electric vehicle only when mated with electrodes, which again can contribute to the high power charging functionality, at least for safety thereof.

A further issue that can arise in high power charging is oxidation of electrodes 211 and/or oxidation of complementary electrodes of the electric vehicle being charged. Hence, in present implementations, electrodes 211 can be further configured to scrape against the corresponding electrode of the vehicle during a mating operation with the vehicle to remove oxidized material on each electrode. Such functionality can be provided, at least in part, by the angle of electrodes 211, however the pivoting of electrodes 211 and/or pivoting of U-shaped portion 215 from which electrodes 211 an extend, can also contribute to the scraping functionality. Such pivoting can also contribute to relaxation of precision of alignment of electrodes 211 with the complementary electrodes of the vehicle during the mating operation. Hence, the pivoting and the mating operation are now described in further detail.

Figure 3:
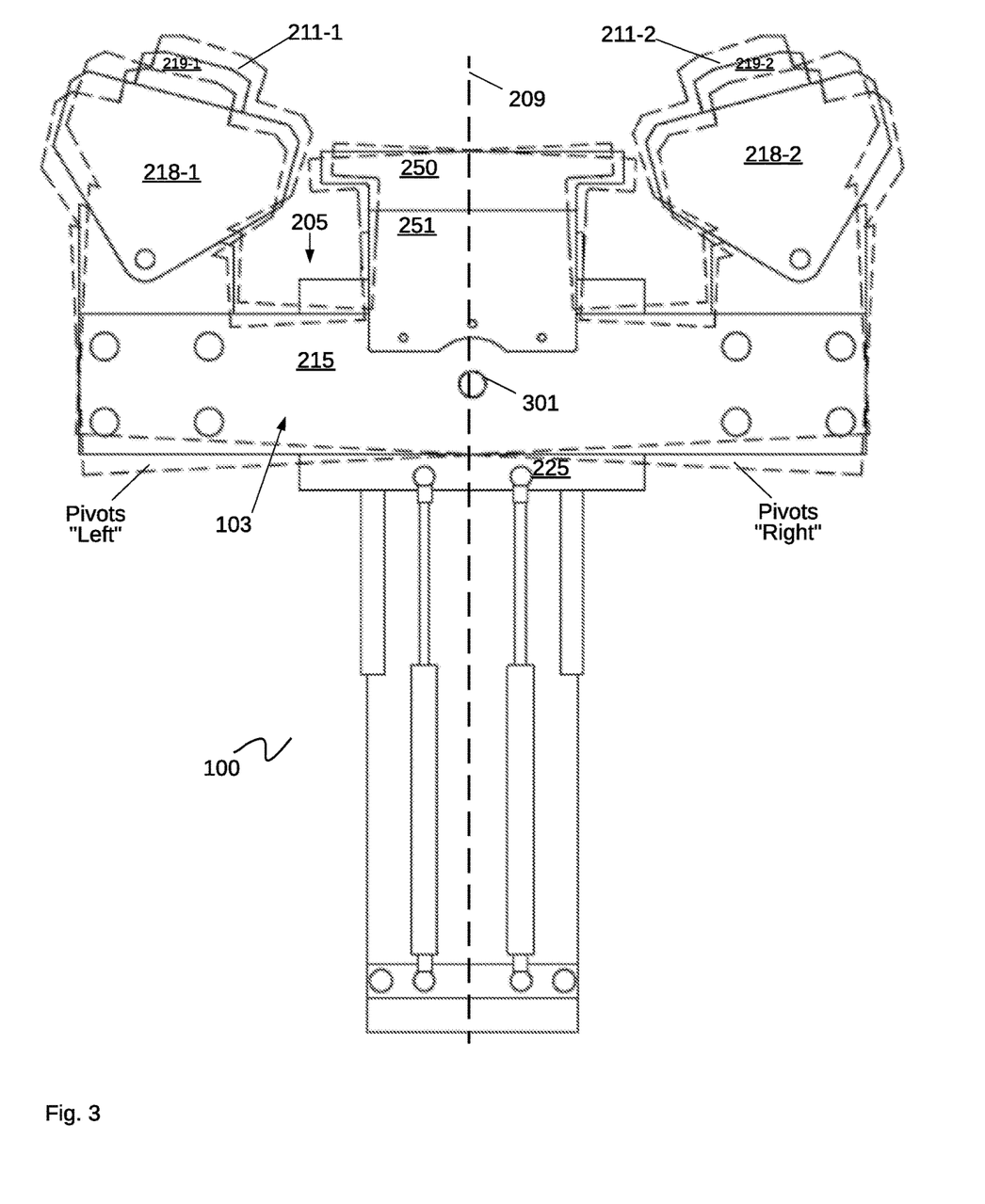
FIG. 3 depicts a pivoting U-shaped portion of a chassis of the device of FIG. 1, according to non-limiting implementations.

Attention is hence next directed to FIG. 3, which depicts device 100 in uncompressed position 2-I, and is substantially similar to device 100 in uncompressed position 2-I in FIG. 2, with like elements having like numbers; furthermore, while not all components of device 100 are indicated for clarity, they are nonetheless assumed to be present. Specifically, in FIG. 3, U-shaped portion 215 of chassis 103 is depicted as being pivotally attached to sliding portion 225 at a pivot 301 located along longitudinal axis 209. Pivot 301 can hence comprise a pivot connector, connecting U-shaped portion 215 to sliding portion 225.

For example, U-shaped portion 215 can be configured to rotate over a given angular range about pivot 301, relative to longitudinal axis 209, including, but not limited to, angles in a range of about 10° to about 30°. The dashed lines in FIG. 3 show positions of two electrodes 211, U-shaped portion 215, and interlock 250, as U-shaped portion 215 pivots about pivot 301 from "Left" to "Right", though such terms are appreciated to be relative and used with respect to the left and right sides of FIG. 3 only.

In some implementations, each of two electrodes 211 can also pivot. For example, attention is next directed to FIG. 4, which depicts device 100 in uncompressed position 2-I, and is substantially similar to device 100 in uncompressed position 2-I in FIG. 4, with like elements having like numbers; furthermore, while not all components of device 100 are indicated for clarity, they are nonetheless assumed to be present. Specifically, in FIG. 4, each of two electrodes 211 is depicted as being configured to pivot relative to chassis 103. Specifically, each of two electrodes 211 is located at a respective end of U-shaped portion 215, and extending away from front side 205, and pivotally attached thereto at a respective pivot 401-1, 401-2 (interchangeably referred to hereafter, collectively, as pivots 401 and, generically, as a pivot 401); for example each body 218 is attached to a respective end of a U-shaped portion 215 at a respective pivot 401, on a side opposite a respective electrical connection portion 219. Each pivot 401 can hence comprise a pivot connector, a respective body 218 to a respective end of U-shaped portion 215.

Figure 4:
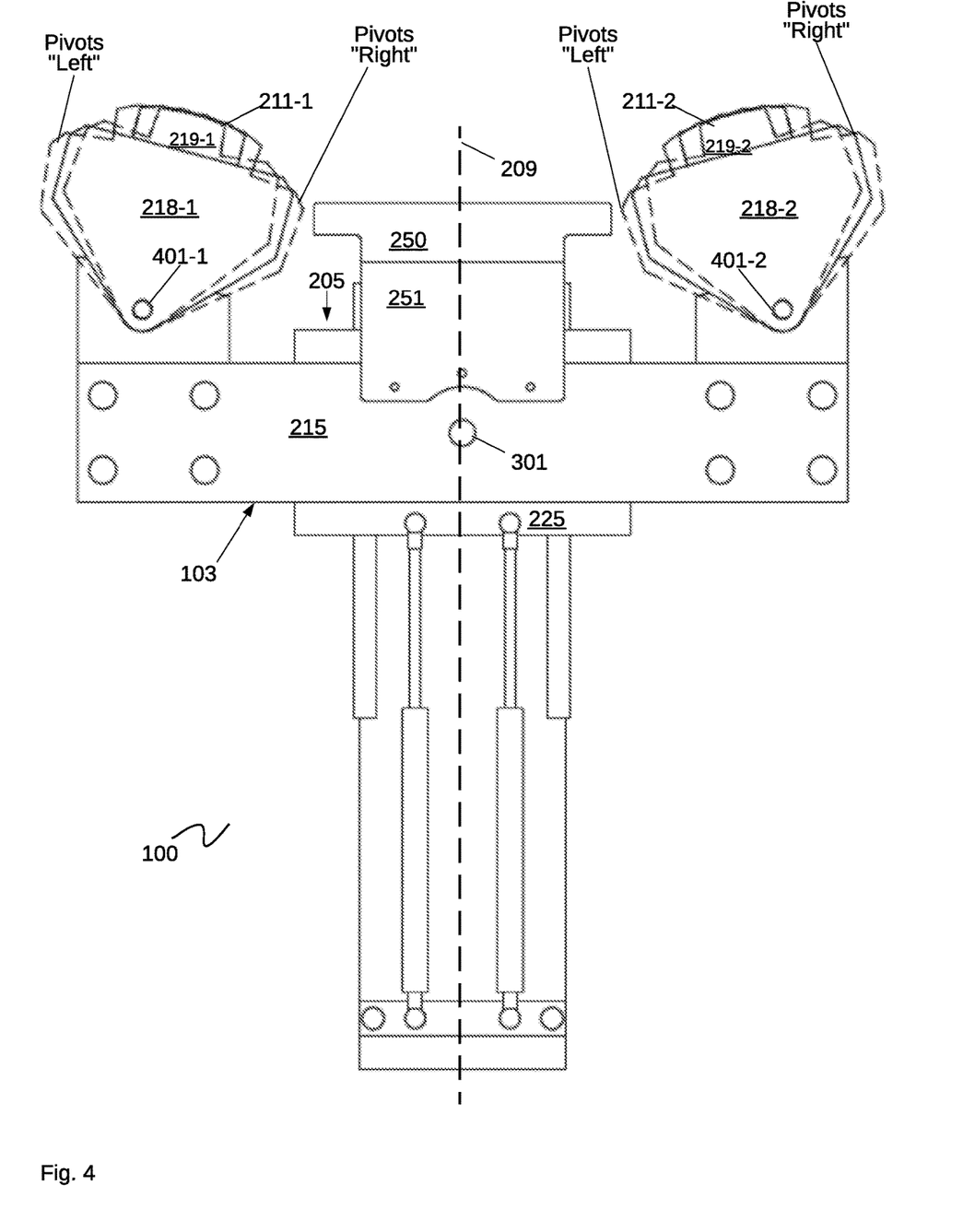
FIG. 4 depicts pivoting of the electrodes of the device of FIG. 1, according to non-limiting implementations.

Hence, in addition to pivoting provided by U-shaped portion 215 pivoting about pivot 301, each of the two electrodes 211 can also pivot about respective pivots 401, relative to chassis 103 and/or respective ends of U-shaped portion 215. The dashed lines in FIG. 4 show positions of two electrodes 211, as each pivot about a respective pivot 401 from "Left" to "Right", though such terms are appreciated to be relative and used with respect to the left and right sides of FIG. 4 only. Each can be configured to rotate, for example, through a range of about 10° to about 30°, relative to an initial position (i.e. 15° relative to front side 205 of chassis 103).

Such pivoting, in combination with angling of electrodes 211 towards each other, can contribute to scraping of electrodes 211 with complementary electrodes of the electric vehicle during a mating operation, as described in further detail hereafter.

Figure 5:
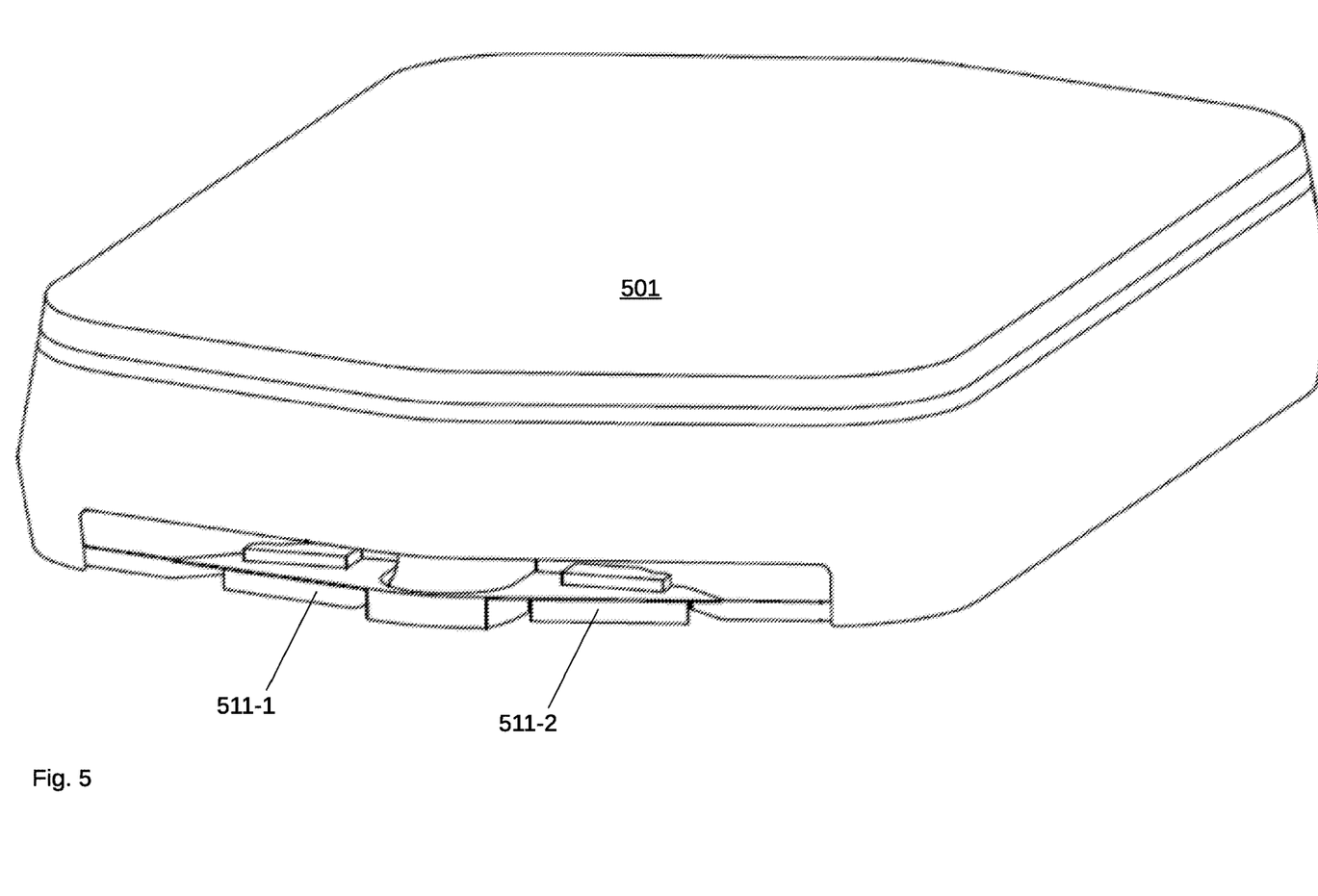
FIG. 5 depicts an electric vehicle configured to interface with the device of FIG. 1, according to non-limiting implementations.

Attention is now directed to FIG. 5 which depicts a perspective view of a non-limiting example a vehicle 501 configured to mate with device 100. In particular, vehicle 501 comprises an electrically powered vehicle and, as such, comprises a rechargeable battery and an electric motor powered by the battery. While FIG. 5 only depicts an external portion of vehicle 501, it is appreciated that vehicle 501 the battery and the motor are internal to vehicle 501 and whole not depicted are nonetheless present. As depicted, vehicle 501 can generally comprise one or more of a robot, an unmanned ground vehicle, an unmanned surface vehicle, an amphibious vehicle, any other suitable vehicle, and/or a combination, and the like, configured to receive commands, for example from a server and/or a controller device via a network to move to a given coordinate and/or perform a given task, and implement movement to the given coordinate and/or performance of the given task without a person on board. In other words, vehicle 501 can comprise a remote controlled and/or remote guided vehicles and/or an autonomous vehicle which can operate without human intervention in the environment. As depicted, in FIG. 5, vehicle 501 comprises a wheeled land vehicle and, in particular, a wheeled vehicle that can be used within a warehouse to one or more of move and/or carry inventory and/or items within the warehouse and/or perform tasks within the warehouse for example by interacting with features within the warehouse including, but not limited to, conveyors and the like. It should be emphasized that the shape and structure of vehicle 501 is purely an example, and contemplates a device that can be used for autonomous and/or remote controlled wheeled movement. However, vehicle 501 can be adapted for any suitable specialized functions, including, but not limited, to one or more of, warehouse applications, environmental applications, farming applications, and/or any application that can be implemented by a wheeled vehicle. Furthermore, vehicle 501 can comprise an electric passenger vehicle including, but not limited to, cars, trucks, buses, trains, utility vehicles, construction vehicles and the like. Indeed by now it is apparent that a wide variety of electrically powered vehicles are contemplated and within the scope of present implementations.

FIG. 5 also shows two electrodes 511-1, 511-2 of vehicle 501, which are assumed to be connected to the battery of vehicle 501 and/or a battery charging system of vehicle 501. For convenience, two electrodes 511-1, 511-2 will be interchangeably referred to hereafter, collectively, as two electrodes 511 and/or electrodes 211, and generically as an electrode 511.

Figure 6:
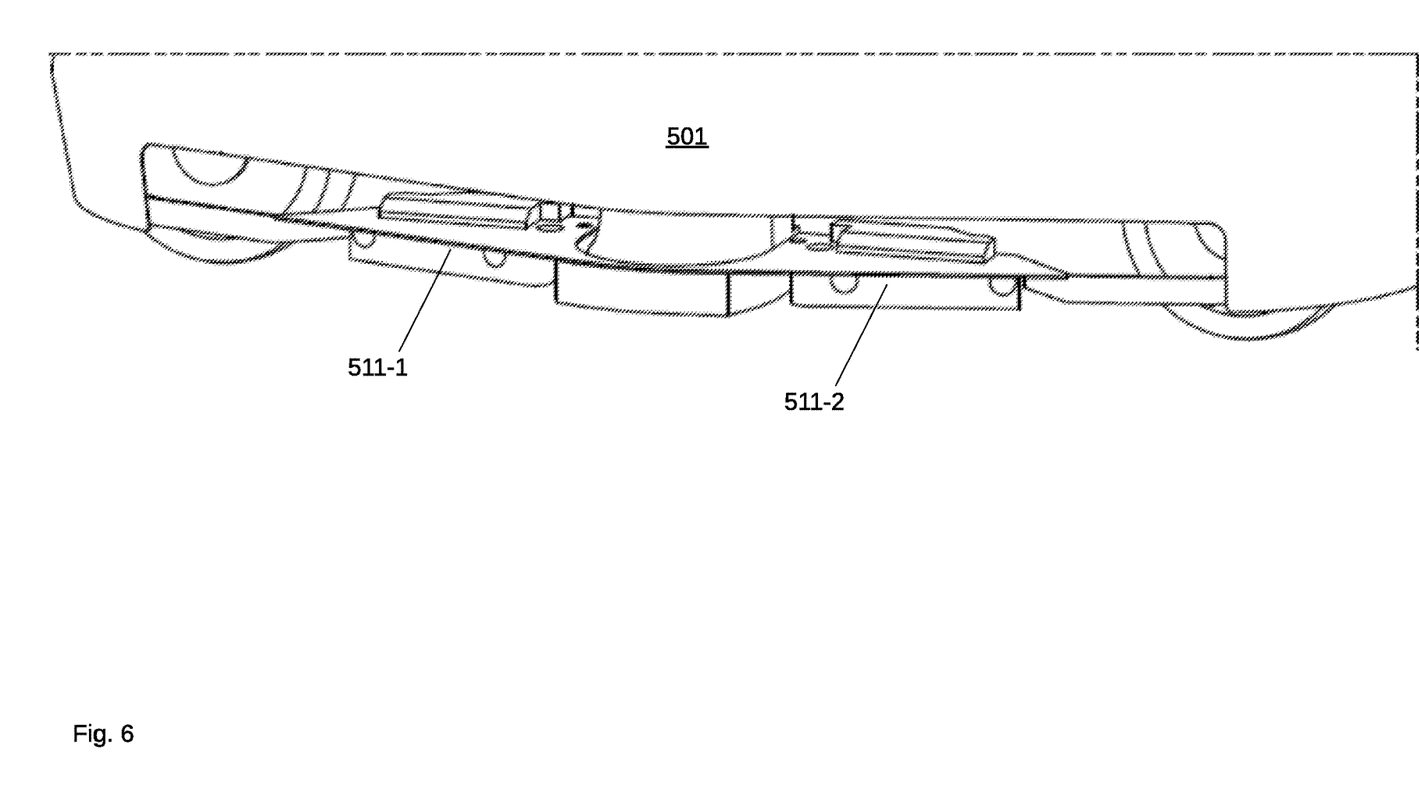
FIG. 6 depicts details of electrodes of the electric vehicle of FIG. 5, according to non-limiting implementations.

Two electrodes 511 are located at a height and position on vehicle 501 to respectively mate with two electrodes 211 of device 100. Details of two electrodes 511 of vehicle 501 are also depicted in FIG. 6. In general, a physical configuration of two electrodes 511 is complementary to two electrodes 211, and hence two electrodes 511 are located on a side of vehicle 501, and along an axis of movement of vehicle 501. Furthermore, a front edge of each of two electrodes 511 can generally be angled away from each other at an angle (relative to the side of vehicle 501 along which electrodes 511 are located) that is similar to the angle at which electrodes 211 are angled towards each other.

Furthermore, as best seen in FIG. 6, electrodes 511 can also be recessed in vehicle 501, assuming that electrodes 211 and/or electrical connection portions 219 are not recessed at device 100. Hence, electrodes 511 can be recessed into vehicle 501 at a distance that is similar to a distance that electrical connection portions 219 extend from electrodes 211. Hence, a physical configuration of electrical connection portions 219 can be selected, and a physical configuration of electrodes 511 then selected to be complementary to electrical connection portions 219, or vice versa. However, electrodes 511 can also extend from the side of vehicle 501 or at least a portion of electrodes 511 can be flush with the side of vehicle 501.

Furthermore, two electrodes 511 are assumed to replace electrodes that extend from a bottom of prior art vehicles that are intended to mate with electrodes of charging system that are located on a floor; indeed, in such systems, such downward facing electrodes are generally attached to an active mechanism that moves them towards the floor mounted electrodes, relative to the vehicle, when the vehicle is located over the floor mounted electrodes. In contrast to such systems, two electrodes 511 are passively located at a side of vehicle 501 and need not be configured to move relative to vehicle 501.

In other words, assuming device 100 is mounted to a floor, and electrodes 211 extend therefrom about parallel with the floor, and device 100 is initially in uncompressed position 2-I, vehicle 501 is generally guided towards device 100 (either autonomously or by a human) such that two electrodes 511 move towards and/or face two electrodes 211 (e.g. as each set of electrodes 211, 511 are located, respectively, at a side of each of device 100 and vehicle 501, and not from a top or a bottom of device 100 and/or vehicle 501). As electrodes 511, 211 touch and/or mate, vehicle 501 continues to move towards device 100 and which pressure and/or a force to two electrodes 211, which is translated to chassis 103, and moves chassis 103 towards compressed position 2-II. In other words, during the mating operation, chassis 103 moves towards compressed position 2-II, biasing portion 213 being compressed during the mating operation, and hence two electrodes 211 are biased towards corresponding electrodes 511 of vehicle 501.

Figure 7:
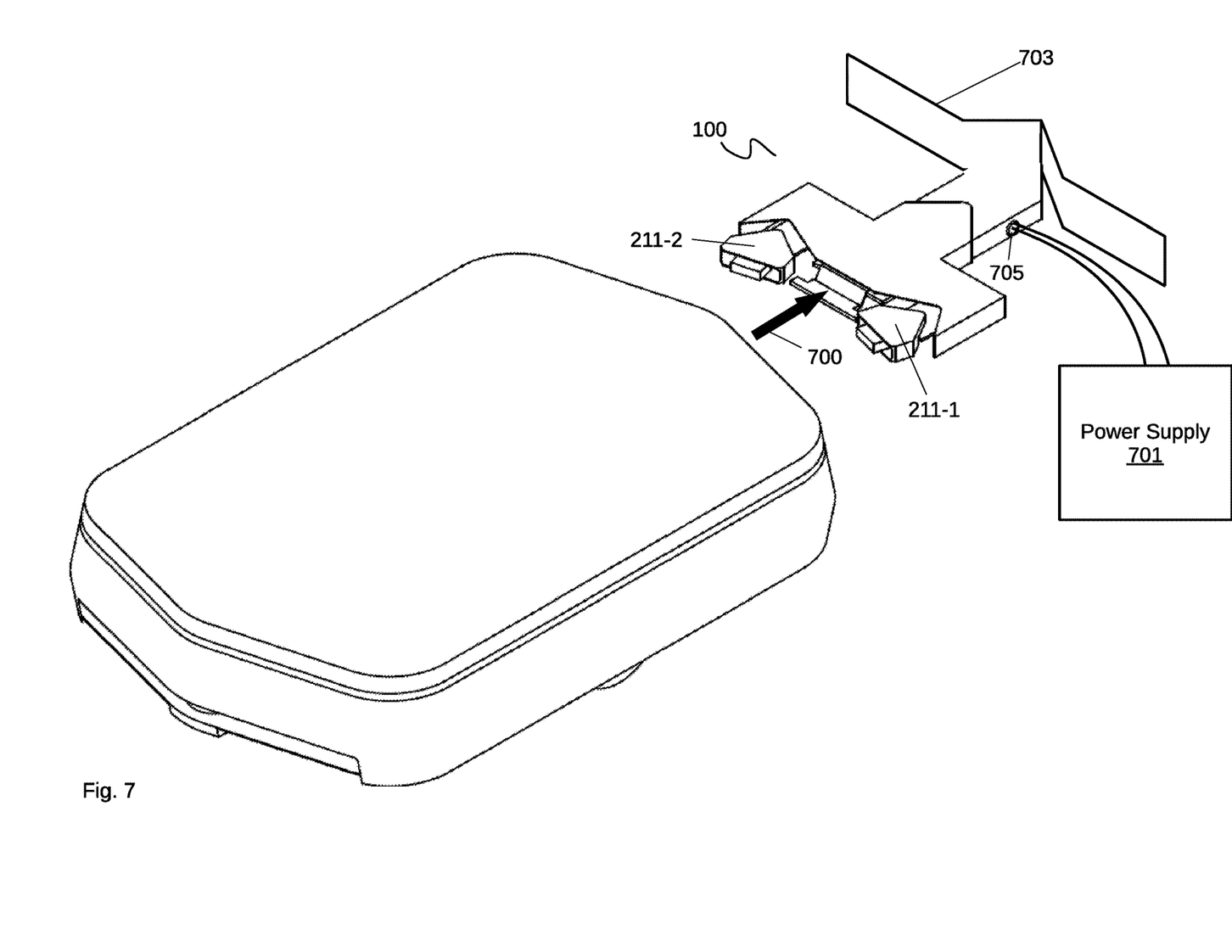
FIG. 7 depicts the device of FIG. 1 mating with an electric vehicle having corresponding electrodes, according to non-limiting implementations.
Figure 8:
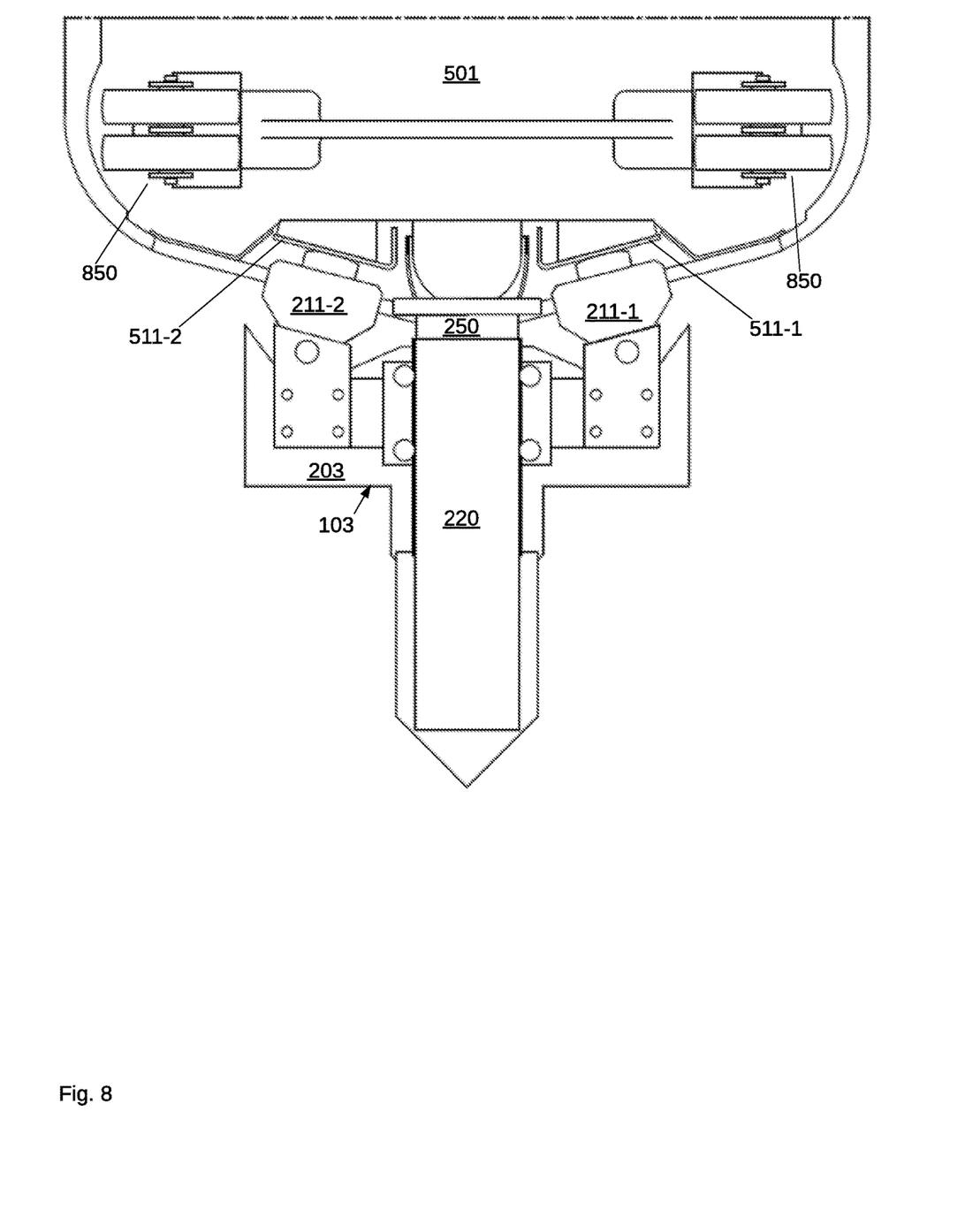
FIG. 8 depicts an underside view of the electric vehicle and the device of FIG. 1 in a mated configuration, according to non-limiting implementations.

Attention is next directed towards FIG. 7 and FIG. 8 which depicts the mating operation. In particular, FIG. 7 depicts a perspective view of vehicle 501 and device 100 as vehicle 501 approaches device 100 and electrodes 511 (not visible in FIG. 7) approach electrodes 211, as indicated by arrow 700; and FIG. 8 depicts an underside view of device 100 and vehicle 501 in a mated position, after mating has occurred and device 100 is in compressed position 2-II. FIG. 7 also depicts further details of device 100. For example, FIG. 7 also depicts a power supply 701 (e.g. a power supply external to device 100) and a docking target 703. In general, power supply 701 comprises a power supply, which can supply high power to device 100 at least when vehicle 501 is mated therewith. For example, in a successful prototype, an electric vehicle can be charged with high power of about 60 VDC and 300 A (18 kW), and has been tested up to 100 A, as compared to prior art devices that charge electric vehicles using floor mounted electrodes with power of 24 VDC and 140 A to a maximum of 3.4 kW. Hence, power supply 701 can provide powers at least at 10 kW and above.

As described above, device 100 can comprise two electrical connectors 705 configured to connect two electrodes 211 (and specifically electrical connection portions 219) to external power supply 701. In other words connectors 705 connect to respective cables that lead to external power supply 701, and which further internally connect to two electrodes 211. Furthermore, while not depicted, device 100 can comprise another connector that connects interlock 250 to power supply 701; interlock 250 can transmit data to power supply 701 via such a connector that indicates when vehicle 501 is detected or not detected to cause power supply 701 to turn power on (e.g. when vehicle 501 is detected) or cause power supply 701 to turn power off (e.g. when vehicle 501 is no longer detected). Alternatively, interlock 250 can further comprise a switch which turns power on and off within device 100.

As depicted in FIG. 7, device 100 can further comprise docking target 703 which, as depicted, can be located at a back end of device 100 and can be connected or not connected to housing 101. For example, docking target 703 can comprise a component that is physically separate from other components of device 100, but located proximal the other components of device 100. Alternatively, docking target 703 can be located on top of device 100, on housing 101 and/or beside device 100 and/or housing 101. Regardless, docking target 703 comprises a device whose position can be detected by vehicle 501, for example using an on-board imaging sensor, such that a relative position of electrodes 211 can be determined by vehicle 501. In other words, vehicle 501 can be configured to detect a position of docking target 703, and be further configured to implement a mating operation that takes into account positions of electrodes 211 relative to docking target 703.

Alternatively, a computing device controlling vehicle 501 can be transmit instructions for mating vehicle 501 to device 100 without requiring that docking target 703 be imaged, for example using GPS (global positioning system) coordinates and an on-board GPS system, and/or relative positioning coordinates (e.g. relative to factory and/or a warehouse) and an on-board positioning system. In such implementations, docking target 703 is either optional or entirely absent from device 100.

In an event, as vehicle 501 approaches device 100, as indicated by arrow 700, electrodes 511 mate with electrodes 211 (and specifically electrical connection portions 219) by applying pressure and/or a force thereto, until vehicle 501 stops moving and vehicle 501 and device 100 are in a mated position as depicted in FIG. 8. In particular, in FIG. 8, bottom 203 of chassis 103 is depicted, as is a bottom of guide portion 220, and a portion of a bottom of vehicle 501, including wheels 850 of vehicle 501; furthermore, in FIG. 8, electrodes 211, 511 are shown in contact, in a mated position, with electrodes 211 applying a force to electrodes 511.

When electrodes 211, 511 are not perfectly aligned, which can usually be the case, electrodes 211 can pivot (using any of pivots 301, 401) to align electrodes 211 with electrodes 511. Such pivoting can cause electrodes 211, 511 to scrape against each other, which can remove oxide from a surface of each.

Figure 9:
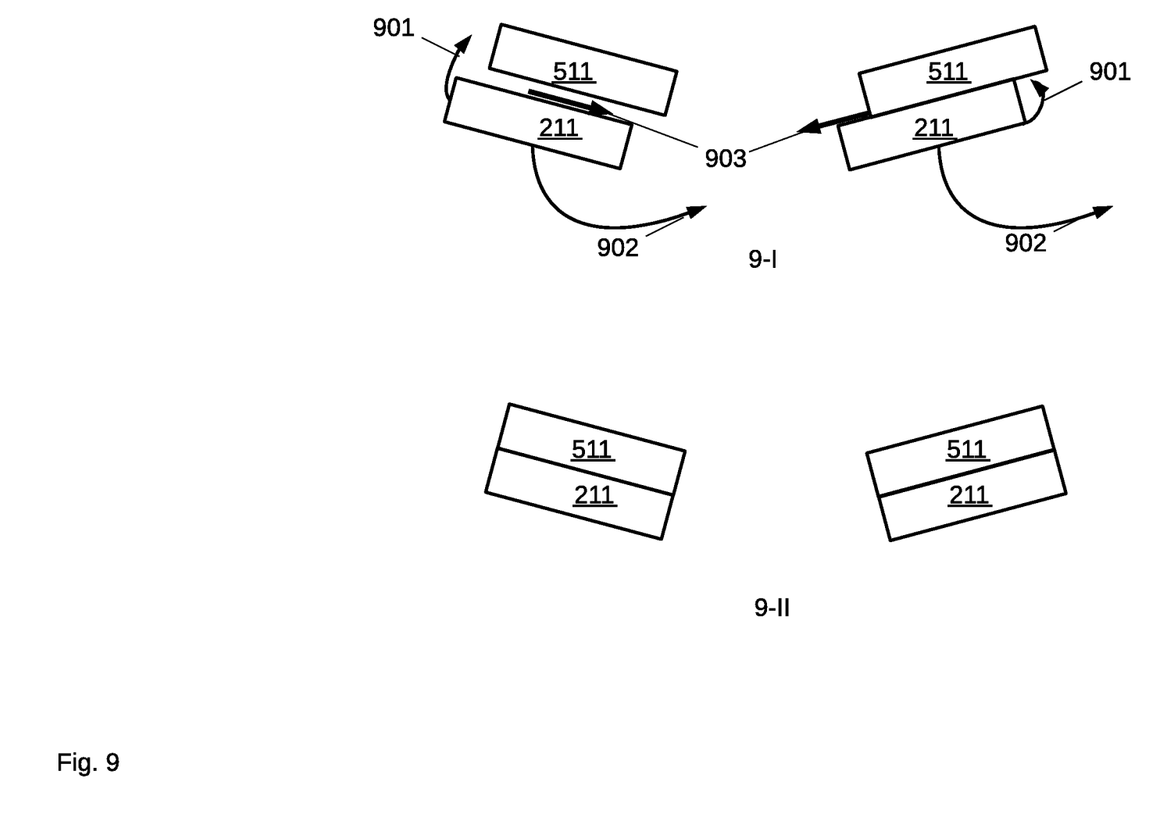
FIG. 9 depicts details of the electrodes of the device and the vehicle during the mating operation of FIG. 7, according to non-limiting implementations.

For example, attention is next directed to FIG. 9 which depicts electrodes 511 mating with electrodes 211 during the mating operation. While electrodes 211 are indicated, it is appreciated that such a mating operation occurs via electrical connection portions 219. Specifically, in FIG. 9, an initial position 9-I and final position 9-II of each of electrodes 211, 511 are depicted. In initial position 9-I, electrodes 211, 511 are not perfectly aligned, and hence, pressure applied to electrodes 211 by electrodes 511 cause electrodes 211 to pivot; arrows 901 show a direction of rotation and/or pivot due to electrodes 211 pivoting about respective pivots 401, and arrows 902 show a direction of rotation and/or pivot due to electrodes 211 pivoting due to U-shaped portion 215 pivoting about pivot 301. As such, due to the pivoting and the angling of electrodes 211, electrodes 211, 511 then scrape against each other, as indicated by arrows 903, until they reach position 9-II. Such scraping also contributes to high power charging as oxidation of electrodes 211, 511 can impede same, and scraping can remove such oxidation. While not depicted, it is assumed that in initial position 9-I, device 100 is in uncompressed position 2-I and in final position, device 100 has been moved towards compressed position 2-II. Hence, in final position 9-II, biasing portion 213 further applies pressure between electrodes 211, 511, again contributing to conditions conducive for high power charging.

Persons skilled in the art will appreciate that there are yet more alternative implementations and modifications possible. For example, while particular physical configurations and/or shapes of each of electrodes 211, 511 are depicted, electrodes 211, 511 need not be as shown. For example, electrodes 211, 511 can be circular in cross-section and/or another shape in cross-section; furthermore, electrodes 211, 511 can be configured in a male/female configuration such that one set of electrodes 211, 511 is insertable into the other set of electrodes 211, 511. Furthermore, while each set of electrodes 211, 511 is depicted as being symmetrical with respect to an axis of either device 100 or vehicle 501, electrodes 211, 511 need not be symmetrically arranged. Furthermore, while electrodes 211 are depicted as pivoting about two respective pivots (e.g. one respective pivot 401 and a common pivot 301), only one pivot can be present, or, in some implementations, no pivot is present. Indeed, in other implementations, electrodes 511 can be configured to pivot in addition to, or rather than electrodes 211.

Furthermore, while particular physical configurations and/or shapes of chassis 103 are depicted, other physical configurations and/or shapes of chassis 103 are within the scope of present implementations. For example, while at least part of chassis 103 being U-shaped allowed for electrodes 211 to extend from ends thereof, and for interlock 250 to be placed there between, in other implementations, a shape of chassis 103 can be adapted to achieve similar functionality without being U-shaped, for example through the use of arms, and the like that extend from chassis 103.

Disclosed herein is an electrical vehicle charging interface device that can enable high power charging of electric vehicles. Electrodes extend from a side of the device and are biased towards an uncompressed position such that when complementary electrodes of a vehicle mate with the electrodes, pressure is applied there between. Furthermore the electrodes can be angled towards each other and further configured to pivot which can cause the electrodes to scrape against the complementary electrodes of the vehicle during the mating operation. An interlock can turn power on only when the vehicle is mated with the device for safety. Hence, in general, high power charging of electric vehicles can be enabled using the described electrical vehicle charging interface device.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. An electric vehicle charging interface device comprising:
a chassis having a top, a bottom, a front side, and a back side opposite the front side, the chassis configured to move along a longitudinal axis between an uncompressed position and a compressed position;
two electrodes extending from the front side of the chassis in a direction away from the chassis, the two electrodes being laterally spaced from the longitudinal axis and positioned on opposed sides of the longitudinal axis; and,
a biasing portion configured to bias the chassis towards the uncompressed position.

2. The device of claim 1, wherein the chassis comprises: a U-shaped portion configured to pivot about the longitudinal axis, each of the two electrodes extending from a respective end of the U-shaped portion.

3. The device of claim 1, further comprising a guide portion having a front end and a back end, the chassis configured to slide along the guide portion between the front end and the back end, the chassis located proximal the front end of the guide portion in the uncompressed position and located away from the front end in the compressed position.

4. The device of claim 3, wherein the chassis comprises: a U-shaped portion and a sliding portion, the sliding portion configured to mate with the guide portion and slide along the guide portion, the U-shaped portion on top of the sliding portion and pivotally connected thereto, each of the two electrodes extending from a respective end of the U-shaped portion.

5. The device of claim 3, wherein the guide portion is configured for attachment to a floor, the bottom of the chassis is configured is configured to slide along the guide portion, and the two electrodes are configured to extend horizontally from the chassis, relative to the floor, when the guide portion is attached to the floor.

6. The device of claim 3, wherein the biasing portion extends from the back side of the chassis towards the back end of the guide portion.

7. The device of claim 3, wherein the biasing portion extends from the back side of the chassis towards the back end of the guide portion, and is further attached to each of the back side of the chassis and the back end of the guide portion.

8. The device of claim 1, wherein the two electrodes are symmetrically arranged about the longitudinal axis of the chassis.

9. The device of claim 1, wherein each the two electrodes are configured to independently pivot relative to the chassis.

10. The device of claim 1, wherein each of the two electrodes forms an angle of about 15° with the front side of the chassis, each of the two electrodes angled towards each other.

11. The device of claim 1, wherein each of the two electrodes forms an angle in a range of about 0° to about 70° with the front side of the chassis, each of the two electrodes angled towards each other.

12. The device of claim 1, wherein each of the two electrodes comprises: a respective body; and a respective electrical connection portion extending from the respective body, the respective electrical connection portion configured to: mate with a corresponding electrode of a vehicle: and scrape against the corresponding electrode of the vehicle during a mating operation with the vehicle.

13. The device of claim 12, wherein, during the mating operation, the chassis moves towards the compressed position, the biasing portion being compressed during the mating operation, the two electrodes being biased towards corresponding electrodes of the vehicle.

14. The device of claim 1, further comprising electrical connectors configured to connect the two electrodes to an external power supply.

15. The device of claim 1, further comprising an interlock configured to detect when a vehicle has mated with the two electrodes.

16. The device of claim 15, wherein the interlock extends from the front side of the chassis.

17. The device of claim 15, wherein the interlock comprises one or more of a passive interlock, a magnetic interlock and an optical interlock.

18. The device of claim 15, wherein the interlock is further configured to provide power from an external power supply to the two electrodes only when the vehicle has mated with the two electrodes.

19. The device of claim 15, wherein the interlock is located between the two electrodes.

20. The device of claim 1, further comprising a docking target.

* * * * *

UNITED STATES PATENT AND TRADEMARK OFFICE
CERTIFICATE OF CORRECTION

PATENT NO.        : 10,625,611 B2
APPLICATION NO.   : 15/449441
DATED             : April 21, 2020
INVENTOR(S)       : Matthew Lord et al.

It is certified that error appears in the above-identified patent and that said Letters Patent is hereby corrected as shown below:

In the Claims

Column 13, Line 10, Claim 5, delete "chassis is configured is configured to slide along the guide" and insert --chassis is configured to slide along the guide--.

Signed and Sealed this
Twenty-ninth Day of September, 2020

Andrei Iancu
*Director of the United States Patent and Trademark Office*